(No Model.) 2 Sheets—Sheet 1.
J. & H. McLAREN.
TRACTION ENGINE.
No. 289,294. Patented Nov. 27, 1883.
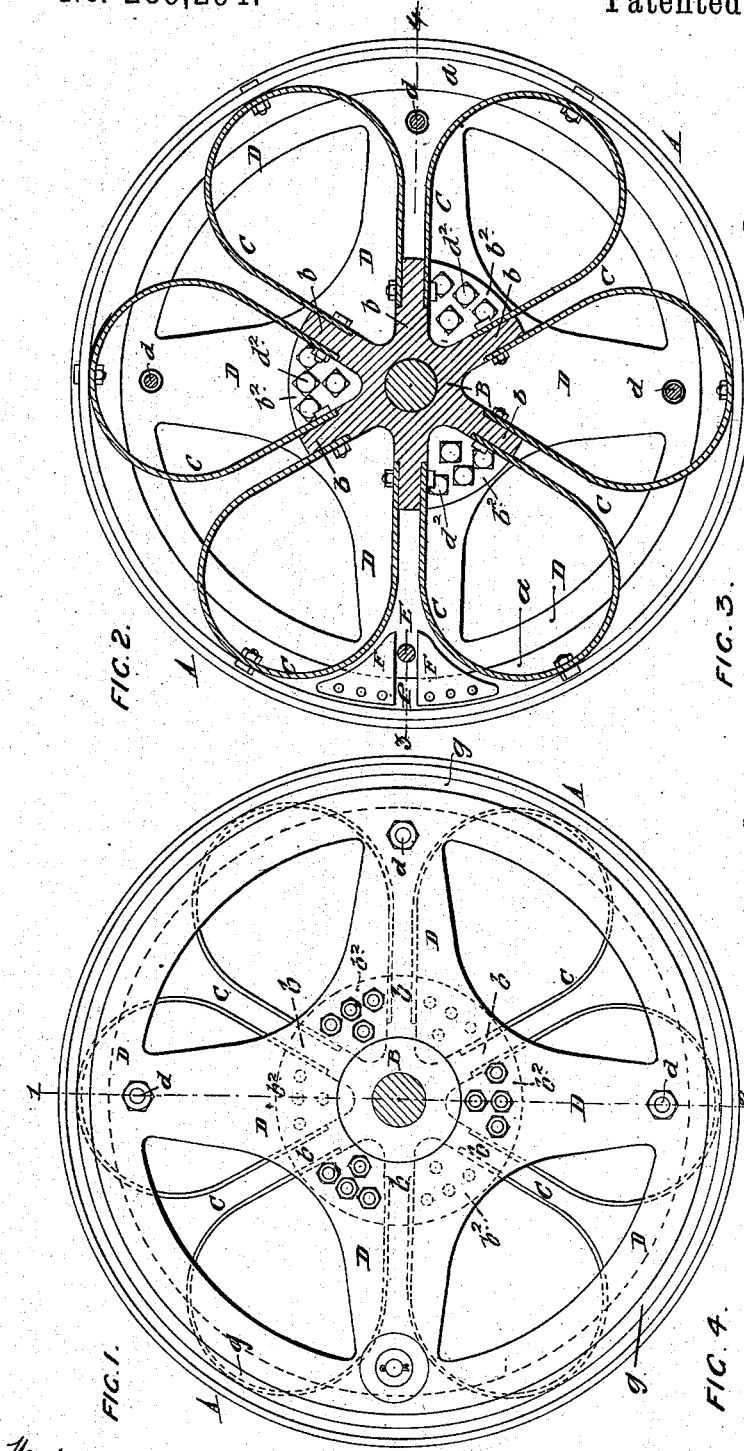
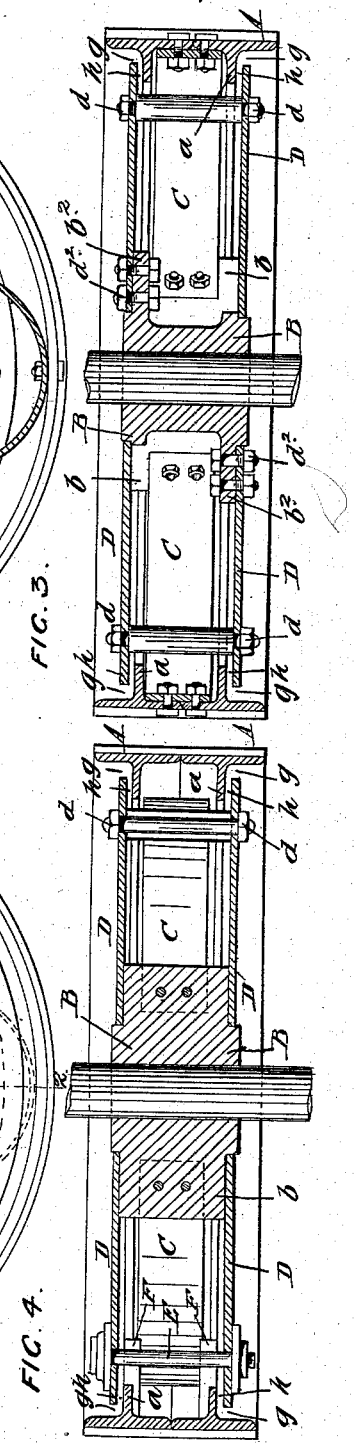
Witnesses:
E. A. Dick
J. Walter Blandford
Inventors:
John McLaren and
Henry McLaren
by Marcellus Bailey atty (No Model.)  2 Sheets—Sheet 2.
J. & H. McLAREN.
TRACTION ENGINE.
No. 289,294. Patented Nov. 27, 1883.
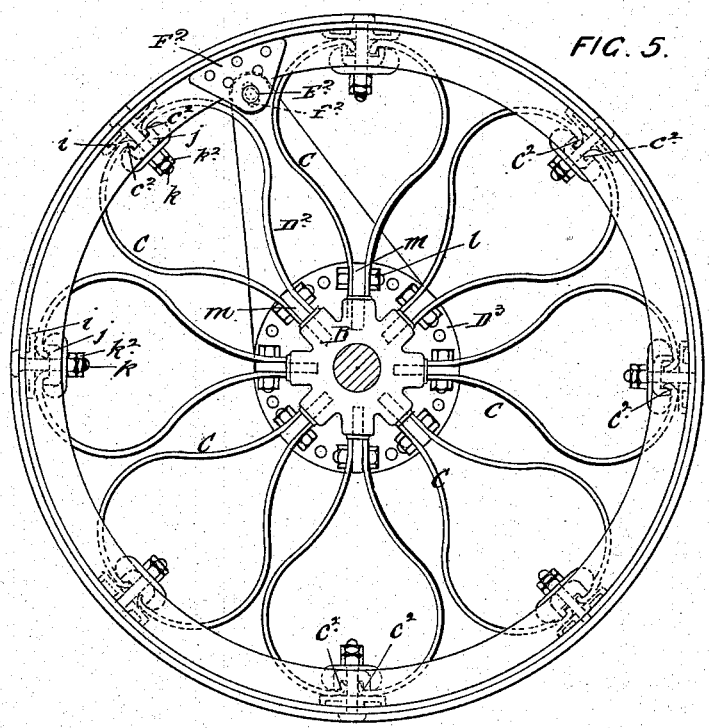
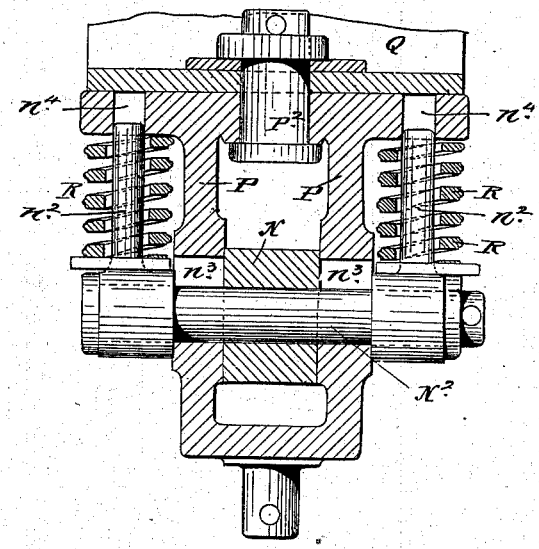
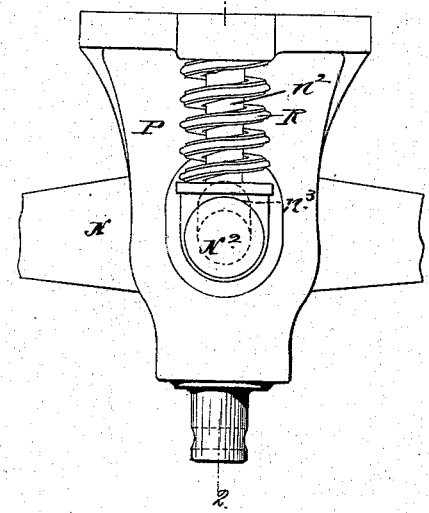
Witnesses:
E. A. Dick
J. Walter Blandford
Inventors:
John McLaren and
Henry McLaren
by Marcellus Bailey, Atty.

UNITED STATES PATENT OFFICE.

JOHN McLAREN AND HENRY McLAREN, OF LEEDS, COUNTY OF YORK, ENGLAND.

TRACTION-ENGINE.

SPECIFICATION forming part of Letters Patent No. 289,294, dated November 27, 1883.

Application filed July 2, 1883. (No model.) Patented in England April 9, 1883, No. 1,786.

*To all whom it may concern:*

Be it known that we, JOHN MCLAREN and HENRY MCLAREN, subjects of the Queen of Great Britain, and both residing at Leeds, county of York, England, have invented certain Improvements in Traction-Engines or like Vehicles, (for which we have obtained a patent in Great Britian, No. 1,786, dated April 9, 1883,) of which the following is a specification.

Our invention relates to means for mounting the body of the engine or vehicle on wheels, so as to give a springing action, which is so desirable, especially with traction-engines or machines of an analogous character. The larger wheels are so constructed or arranged, according to our invention, as hereinafter described, that the springs which give the said action are not submitted to the driving-strain.

Figure 1 is a side elevation; Fig. 2, a vertical section. Fig. 3 is a transverse section on the line 1 2, Fig. 1, and Fig. 4 a transverse section on the line 3 4, Fig. 2, of a wheel constructed or arranged acccording to our invention.

We make an ordinary traction-wheel rim, A, and we make the boss B for the wheel, with ribs or arms $b$ corresponding to the number of springs to be used in the wheel. To these ribs or arms $b$, and to the rim A, we bolt, as shown in the drawings, curved or bowed steel plates or springs C, constituting spring arms or spokes, so broad in proportion to their thickness that they allow the wheel to spring or yield in a vertical direction, and at the same time maintain the wheel in an upright position, owing to their great width, without the aid of guiding-plates, which have been found to be useless, owing to the wear in consequence of their working in mud and sandy grit. The working of the springs is as follows: The spring-arms under the center line of the wheel are in compression, and the spring-arms above the center line are in tension. Thus the weight of the engine is constantly distributed on all or nearly all the spring-arms, no matter what position the wheel is in. In order to impart the driving motion to the rim of the wheel, and thereby relieve the springs of driving-strain, we fix on the sides of the boss B plates D, tied together near the rim by tie-bolts and distance-pieces $d$, the said plates being bolted by bolts $d^2$ to the webs $b^2$ of the boss, so as to make the two plates and the boss virtually one rigid piece. These plates serve to drive the rim, as the curved spring-arms C simply carry the weight. This driving of the rim is effected by means of a pin, E, passing through the said plates D and between two pairs of lugs, F, secured to the rim A. The said pin E works in slots $f$ between the lugs F, so as to allow the wheel to spring in all positions. The said plates D also serve as a buffer or guard to prevent the springs from being broken or strained when the engine is jolted over any obstruction or rough place, in the following manner: They are made a little less in diameter over all than the inside of the wheel, thus leaving a clearance at $g$ for springing. They at the same time prevent the wheel from springing too far, as the plate comes in contact with the inside of the rim before a dangerous strain is put on the springs. There is also a little clearance sidewise at $h$ between the said plates and the webs $a$ of the rim A, so that when the wheel is at work there is no wear, but in case of side strain the plates come into contact with the webs and prevent the curved spring-arms C from getting twisted too far sidewise, and thus the said arms will always be able to return to their original upright position, and the wheel be thus kept true edgewise.

We prefer, instead of casting a flange round each side of the boss, (to secure the driving-plates,) to cast only half the flange at one side and half at the other—that is to say, we make the flange up of webs $b^2$, situated between adjacent arms $l$, alternately on one and the other side of the boss, so that by taking off the driving-plates D we can take any one spring-arm C out without disturbing the others. One half of the springs can be taken out at one side and the remainder at the other side. It will be evident that, if desired, a plate may be used on only one side of the boss; but we prefer two plates, as illustrated. The spring-arms C may be in one or several plates or thicknesses, as may be required, and we may also employ rubber tires with webs or bands of strong material embedded therein, either in the shape of webs made of vegetable fiber or metal wire, which are preferably woven or interlaced, or of chain of any suitable construction or pattern.

The following is a modification of our invention, represented by Fig. 5 of the drawings: In place of making each spring C in one piece, riveted or bolted to the rim A, and to the boss, we form each such spring in corresponding halves or parts formed with turned-in ends at their outer parts, $c^2$, by which they are secured to the rim A by means of a clamping-fastening consisting of a bed-piece, $i$, and a bearing or clip piece, $j$. Through the pieces $i$ $j$ and the rim A of the wheel a bolt or bolts, $k$, is or are passed, and a nut, $k^2$, or nuts being screwed upon the said bolt or bolts $k$ firmly nips the turned-in ends of each two parts or adjacent halves of the springs C between the bed-piece $i$ and bearing-piece $j$, and thus secures the springs C to the rim A without bolt-holes in the springs at this part, which bolt-holes are objectionable, being liable to cause the springs to fracture at the part where the said holes are made. There may be one or more of the fastening-pieces for each adjacent half of the springs. Each half or part of the springs C may be formed of one or more leaves. The inner ends of the said halves or parts are preferably fastened to the hub by means of bolts and nuts, as at $l$, each adjacent half or part of the said springs being bolted to a wrought-iron rib-piece or projection, $m$, cast into a recess in the hub of the wheel. When the rim is driven by a positive motion directly imparted thereto, so as to take the driving-strain off the wheels, we effect this by means of a crank-arm, $D^2$, on one or both sides of the wheel, the said arm or arms at the inner end being formed with a plate, $D^3$, bolted or otherwise fastened to the hub of the wheel, and the outer end or ends being connected to the rim of the wheel by a crank-pin, $E^2$, working in a radial slot or slots, $f^2$, in bracket-pieces $F^2$, formed on or attached to the rim A. The said crank arm or arms $D^2$ may be formed in one with the spur-gearing used to drive the engine.

Fig. 6 is a front elevation, and Fig. 7 is a vertical section on the line 1 2, Fig. 6, of the arrangement of the front wheels to give a springing and yielding action thereto. The axle N of the front wheels has a pin or bar, $N^2$, passing through it transversely, the said bar being furnished with guide-pins $n^2$. These are mounted in a bracket, P, which is attached to the bracket Q (fastened to the boiler or other suitable part of the engine or vehicle) by the pin $P^2$, so that the said bracket P can turn on the said pin $P^2$. The bar $N^2$ can rise and fall in slots $n^3$ in the parts of the bracket P, between which the mid part of the axle N is situated, and the pins $n^2$ slide in holes $n^4$. Springs R, encircling the pins $n^2$ and bearing at one end on the bracket P and at the other end upon plates carried by the pins $n^2$, tend to keep the axle in its lowest position in the bracket P. By this arrangement the springs R give a springing action to the front wheels, while the axle can turn on the bar or pin $N^2$ when the engine or vehicle meets any inequality in the road.

We claim—

1. In a traction-wheel, the combination, with the rim, the boss, and the spring spokes or arms connecting the two, of means, substantially as described, whereby the driving movement is imparted to the rim independently of and without driving-strain upon said spokes, substantially as hereinbefore set forth.

2. The combination, with the rim and boss of a traction-wheel, of spring-spokes formed in two parts, with turned-in portions $c^2$, connected to the rim by a clamp or clamps, substantially as and for the purposes hereinbefore set forth.

3. The combination, with the boss and the two-part spring-spokes, of the pieces $m$ and connecting bolts and nuts, substantially as and for the purposes hereinbefore set forth.

4. The combination, with the axle of the front wheels of traction-engines or other vehicles, of a bracket, P, turning upon a center, $P^2$, and carrying a bar or pin, $N^2$, upon which the axles turn, the said bar or pin being capable of rising in slots in the said bracket in opposition to springs R, substantially as hereinbefore described, and illustrated in Figs. 6 and 7 of the accompanying drawings.

In testimony whereof we have signed our names to this specification in the presence of two subscribing witnesses.

JOHN McLAREN.
HENRY McLAREN.

Witnesses:
  GEORGE CHAPMAN,
    *Clarion Street, Wakefield.*
  ARTHUR MITCHELL,
    *17 Union Terrace, Dewsbury Road, Leeds.*